United States Patent
Passier et al.

(10) Patent No.: US 7,260,324 B2
(45) Date of Patent: Aug. 21, 2007

(54) AUTOMATIC OPTICAL POWER MANAGEMENT IN OPTICAL COMMUNICATIONS SYSTEM

(75) Inventors: Chris Passier, Kanata (CA); David Atkinson, Ottawa (CA); Carl Krentz, Manotick (CA); Madhu Krishnaswamy, Nepean (CA); Jean Guy Chauvin, Navan (CA); Andrew Robinson, Ottawa (CA); Rajkumar Nagarajan, Ottawa (CA)

(73) Assignee: Altera Corporation, San Jose, CA (US)

( * ) Notice: Subject to any disclaimer, the term of this patent is extended or adjusted under 35 U.S.C. 154(b) by 649 days.

(21) Appl. No.: 10/241,186

(22) Filed: Sep. 11, 2002

(65) Prior Publication Data

US 2004/0047628 A1 Mar. 11, 2004

(51) Int. Cl.
*H04B 10/08* (2006.01)
(52) U.S. Cl. .............................. 398/17; 398/13; 398/30
(58) Field of Classification Search .................. 398/13, 398/14, 15, 17, 20, 21, 22, 23, 24, 30; 359/334, 359/341.2, 341.4, 341.41, 341.42, 341.44
See application file for complete search history.

(56) References Cited

U.S. PATENT DOCUMENTS

| | | | |
|---|---|---|---|
| 4,994,675 A * | 2/1991 | Levin et al. ................. 250/551 |
| 5,513,029 A | 4/1996 | Roberts | |
| 5,615,033 A | 3/1997 | Yoshida et al. | |
| 5,859,716 A | 1/1999 | O'Sullivan et al. | |
| 5,914,794 A | 6/1999 | Fee et al. | |
| 5,943,146 A | 8/1999 | Harano | |
| 6,194,706 B1 | 2/2001 | Ressl | |
| 6,317,255 B1 * | 11/2001 | Fatehi et al. ........... 359/341.44 |
| 6,344,915 B1 | 2/2002 | Alexander et al. | |
| 6,359,708 B1 | 3/2002 | Goel et al. | |
| 6,563,979 B2 * | 5/2003 | Feinberg et al. ............... 385/24 |
| 6,674,566 B2 * | 1/2004 | Fludger et al. ............. 359/334 |
| 6,920,287 B1 * | 7/2005 | Hinds et al. .................... 398/9 |
| 2002/0024690 A1 * | 2/2002 | Iwaki et al. ................. 359/110 |
| 2002/0114060 A1 * | 8/2002 | Kobayashi et al. ......... 359/334 |

* cited by examiner

*Primary Examiner*—Leslie Pascal
(74) *Attorney, Agent, or Firm*—Harness, Dickey & Pierce, P.L.C.

(57) ABSTRACT

An automatic optical power management system for use with an optical communications system includes a light source residing in a first circuit pack and adapted to emit light at a nominal power level only absent receipt of an indicator signifying a loss of signal resulting from a fiber discontinuity relating to the first optical fiber, wherein the nominal power level is of sufficient magnitude to violate laser safety guidelines in the event of the fiber discontinuity. A redundant detection system includes a first optical detector residing in the first circuit pack, and a second optical detector residing in a second circuit pack that is optically adjacent to the first circuit. A redundant response system communicates an indicator signifying loss of signal from the first and second optical detectors to the light source upon detection of loss of signal by either detector.

18 Claims, 9 Drawing Sheets

AUTOMATIC OPTICAL POWER MANAGEMENT IN OPTICAL COMMUNICATIONS SYSTEM

FIELD OF THE INVENTION

The present invention generally relates to optical communications systems and particularly relates to automatic optical power management in a wavelength division multiplexed optical communications system.

BACKGROUND OF THE INVENTION

Automatic power management in optical communications systems in general, and Automatic optical Power Reduction (APR) in particular, is a challenge that others have attempted to overcome with varying degrees of success. The need for automatic optical power reduction arises primarily due to safety considerations. In particular, intensity of light exiting a severed optical fiber can easily damage eyesight of individuals not wearing eye protection.

Two competing considerations, speed and reliability, complicate the challenge of providing automatic power reduction. On one hand, optical power needs to be automatically reduced in less than one second after a fiber has been severed in order to maximize safety. On the other hand, optical power must not be automatically reduced needlessly, as with false detection of severed fiber.

Past attempts to address the challenges associated with speedy and reliable automatic power reduction have taken two forms: telemetry-based solutions and reflection-based solutions. Telemetry-based and reflection-based power reduction schemes exhibit varying levels of reliability for signaling LOS under different operating conditions. These solutions also incorporate response mechanisms of varying speed and reliability according to various situations.

Telemetry-based solutions have generally relied on detecting Loss Of Signal (LOS) at a network element that is downstream from an upstream emitting light source, and then communicating an LOS indicator upstream via an Optical Supervisory Channel (OSC). The upstream emitting light source undergoes automatic power reduction in response to the LOS indicator. Telemetry-based solutions have been implemented in various ways, and at least two embodiments are available depending on whether fiber is unidirectional or bidirectional.

Referring to FIG. 1, a first telemetry-based embodiment generally for use with two unidirectional fibers relies on detecting LOS at a downstream network element 20 resulting from fiber discontinuity 22, 24, and/or 26 on a first fiber. The LOS may be detected in the OSC at an out-of-path, downstream detector inherent to OSC circuit pack 28, or in the actual data channel at in-path, downstream detector 30 of downstream Erbium-Doped Fiber Amplifier (EDFA) circuit pack 32. If the LOS is detected at the in-path, downstream detector 30, a signal from downstream EDFA circuit pack 32 to OSC circuit pack 28 indicates LOS. In either case, an LOS indicator is then communicated upstream to upstream network element 34 via an OSC over a second fiber, and the indicator is received at OSC circuit pack 36. OSC circuit pack 36 then signals the LOS indicator to EDFA circuit pack 38, and the corresponding upstream emitting light source undergoes automatic power reduction.

There exist several disadvantages with regard to this first telemetry-based embodiment. For example, LOS may only be detected in the OSC for fiber discontinuities in a portion of fiber shared by the OSC and the actual data channel. Thus, LOS from fiber discontinuity 22, 24, and/or 26 may be detected at in-path, downstream detector 30, but the out-of-path, downstream detector inherent to OSC circuit pack 28 cannot detect LOS from fiber discontinuity 22 and/or 26. Also, a scheme that relies on detecting LOS at the out-of-path, downstream detector inherent to OSC circuit pack 28 cannot function properly if OSC circuit pack 28 becomes defective or is pulled. Similarly, if OSC circuit pack 36 becomes defective or is pulled, and/or a fiber discontinuity exists in the second fiber, then automatic power reduction for the corresponding EDFA of EDFA circuit pack 38 becomes unavailable. Further, where Raman pump 40 is collocated at downstream network element 20 and providing optical gain to the first fiber by transmitting optical power in the upstream direction, Raleigh backscattering along the first fiber can, in some circumstances, overpower the actual data signal and mask LOS due to fiber discontinuities such as 22 and 24, and cause in-path, downstream detector 30 to fail to detect LOS. This disadvantage further renders the first telemetry-based embodiment unsuitable for triggering automatic power reduction for Raman pump 40, which should reduce power in the event of a fiber discontinuity at 22, 24, 26, and/or 42.

Referring to FIG. 2, a second telemetry-based embodiment generally for use with a single bidirectional fiber relies on detecting LOS relating to a counter-propagating OSC signal from a downstream network element 20 at the upstream network element 34. According to this embodiment, a first OSC signal 44 constantly propagates from OSC circuit pack 28 to OSC circuit pack 36 along the bidirectional fiber, and a second OSC signal 46 constantly propagates from OSC circuit pack 36 to OSC circuit pack 28. If the first OSC signal 44 is no longer detected at OSC circuit pack 36, then OSC circuit pack 36 communicates an LOS indicator signal to EDFA circuit pack 38, which performs automatic power reduction in response.

There also exist several disadvantages with regard to this second telemetry-based embodiment. For example, LOS may only be detected in the OSC for fiber discontinuities in a portion of fiber shared by the OSC and the actual data channel. Thus, LOS from fiber discontinuity 24 may be detected, but this power reduction scheme cannot detect LOS from fiber discontinuity 22 26, 26, and/or 42. Also, a scheme that relies on detecting LOS via a counter-propagating OSC signal 44 cannot function properly if OSC circuit pack 28 becomes defective or is pulled. In such a case, LOS may be falsely detected at OSC circuit pack 36 and cause unnecessary automatic power reduction for critical traffic due to a failure of non-critical traffic. Similarly, if OSC circuit pack 36 becomes defective or is pulled, then automatic power reduction for the corresponding EDFA of EDFA circuit pack 38 becomes unavailable.

For further understanding of telemetry-based solutions, reference may be had to the following patents: U.S. Pat. No. 5,615,033, entitled Optical Signal Transmission Apparatus and Method, issued to Yoshida et al.; U.S. Pat. No. 5,914,794, entitled Method of and Apparatus for Detecting and Reporting Faults in an All-Optical Communications System, issued to Fee et al.; U.S. Pat. No. 5,943,146, entitled Optical Transmission System in which No Arrival of a First Light Signal is Notified from a First Station to a Second Station by an Alarm Light Signal Multiplexed with a Second Light Signal in Wavelength, issued to Harano et al.; U.S. Pat. No. 6,194,706 B1, entitled Methods and Systems for Locating Buried Optical Cables, issued to Ressl; U.S. Pat. No. 6,344,915 B1, entitled System and Method for Shutting Off an Optical Energy Source in a Communication System Having Optical Amplifiers, issued to Alexander et al.; and U.S. Pat. No. 6,359,708 B1, entitled Optical Transmission Line Automatic Power Reduction System, issued to Goel et al.

In contrast with telemetry-based solutions, reflection-based solutions have generally relied on detecting a downstream LOS using principles of Raleigh backscattering and/or Fresnel reflection. Thus, an in-path detector is typically placed at an upstream network element to detect back-scattered and/or reflected light resulting from a down stream fiber discontinuity. An optical power threshold is set and the upstream emitting light source undergoes automatic power reduction in response to the detected back-scattered and/or reflected light. Reflection-based solutions have been implemented in a number of different ways, and at least two embodiments are available.

Referring to FIG. 3, a first reflection-based embodiment shows two types of reflection-based detectors. For example, a back-reflection optical detector 48 detects light that is back reflected from downstream using principles of Raleigh backscattering and/or Fresnel reflection. Also, an optical tap 50 downstream of EDFA circuit pack 52 feeds optical power back to tap-based optical detector 54. These optical detectors are more reliable than those of telemetry-based solutions in one sense because they reside on the same circuit packs as the emitting light sources that need to undergo APR in the event of a downstream LOS. Communication of detected LOS to the light source in question is thus greatly simplified, but these detectors also have some disadvantages.

There are several inherent shortcomings of reflection-based detection mechanisms for APR. For example, the amount of reflected power generated at a fiber discontinuity is dependent on the characteristics of the endface at the location of the fiber break, which is unpredictable. Thus, if the Fresnel reflection off the fiber end-face is weak as a result of a highly uneven surface, the power levels detected back at the emission source will not be high enough to trigger a shut down of the source. As a result, LOS may not be detected despite the fact that unsafe power levels may still be exiting off the broken fiber. Also, the amount of back-reflected power reaching the emitting source is dependent on the distance between the source and the location of the fiber break, which is also unpredictable. Thus, optical detector 48 may detect a fiber discontinuity at 22, but not at 24 or 26 due to the greater distance, especially with Ultra Long Haul (ULH) systems, and the discontinuity at 22 may also go undetected in some situations depending on the end-face characteristics of the fiber break. Further, the above shortcomings are also true of discontinuities in the fiber path caused by the removal of optical connectors, especially angle-polished connectors (APC), which are designed to minimize back-reflections. Still further, tap-based detector 54 cannot detect a discontinuity that extends beyond the optical tap. Moreover, with Raman pump 40 flooding the fiber with optical power, optical detector 48 can be overwhelmed if a low threshold is set, so that a higher threshold must generally be used in the presence of a downstream Raman pump. Thus, the problem is further compounded if a fiber discontinuity at 42 lowers optical power received by optical detector 48, such that a fiber break at 22 may not even suffice to raise optical power received by optical detector 48 above the high threshold. As a result, the fiber breaks at 22 and 42 can both go undetected with unsafe power levels exiting off the broken fiber at both locations.

FIG. 4, a second reflection-based embodiment uses dither in the optical signal to partially address the difficulty in using reflection-based detectors in combination with downstream Raman pumps. For example, EDFA circuit packs 38 and 52 produce light signals exhibiting dither characteristics, such that a fiber discontinuity at 56 produces a change in dither tone in an optical signal received at back-reflection optical detector 58. Back-reflection optical detectors 58 and 60 are adapted to detect LOS as a function of change dither tone, such that optical power level contributions of Raman pump 40 do not affect the ability of the back-reflection optical detectors to detect downstream LOS in the same way. However, dither tone detection-based mechanisms are not immune to the power level uncertainties caused by distance and characteristics of the fiber end-face. Further, dithering of multiple emission sources that share the same optical fiber are known to cause unwanted cross-talk (transfer of the dither tone from one optical wavelength to another). This cross-talk limitation is especially true of Raman-assisted transmission systems. Still further, the dither tone detection-based solution fails to detect a fiber discontinuity at 42.

For further understanding of telemetry-based solutions, reference may be had to the following patents: U.S. Pat. No. 5,513,029, entitled Method and Apparatus for Monitoring Performance of Optical Transmission Systems, issued to Roberts; U.S. Pat. No. 5,859,716, entitled Self-Stimulation Signal Detection in an Optical Transmission System, issued to O'Sullivan et al.; and U.S. Pat. No. 6,317,255 B1, entitled Method and Apparatus for Controlling Optical Signal Power in Response to Faults in an Optical Fiber Path, issued to Fatehi et al.

The need remains for an automatic power management solution that does not rely on non-critical channels to determine disruptions to fiber connectivity and/or trigger service-impacting decisions. The need further remains for a solution that does not rely on specific attributes of the discontinuity (connector type or location of fault) to function effectively. The present invention provides such a solution.

SUMMARY OF THE INVENTION

According to the present invention, an automatic optical power management system for use with an optical communications system includes a light source residing in a first circuit pack and adapted to emit light at a nominal power level only absent receipt of an indicator signifying a loss of signal resulting from a fiber discontinuity relating to the first optical fiber, wherein the nominal power level is of sufficient magnitude to violate laser safety guidelines in the event of the fiber discontinuity. A redundant detection system includes a first optical detector residing in the first circuit pack, and a second optical detector residing in a second circuit pack that is optically adjacent to the first circuit. A redundant response system communicates an indicator signifying loss of signal from the first and second optical detectors to the light source upon detection of loss of signal by either detector.

The automatic power management system according to the present invention is advantageous over previous automatic power reduction systems because it combines various types of optical detectors in advantageous fashion. Also, the addition of out-of-path detectors, such as those inherent to an Optical Supervisory Channel (OSC), a counter-propagating signal in mono- or bidirectional fiber, and/or use of the opposite path where two mono-directional fibers are employed ensures plural, swift, and reliable response mechanisms useful in a variety of optical communication systems. Further, separate detection schemes for Raman pumps ensures swift and reliable power reduction where these optical components are employed. Finally, use of a low power setting on initial startup and in the event of LOS assists in improving safety while assisting in locating fiber cuts, especially where the low power setting emits light that is detectable by a downstream receiver and also deemed safe in a case of a fiber discontinuity. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

According to the preferred embodiments of the present invention, each emitting light source, be it a laser, a Raman pump, or an EDFA, has a dedicated detection mechanism at the transmitting and/or receiving end (as appropriate for the communications system in question) that can unambiguously detect presence/absence of that emission source, irrespective of the power levels of other emission sources that may exist on the common fiber. The shutdown sequence is then handled such that APR is first performed on the Raman sources, (potentially non service-affecting), prior to making a determination on service-affecting emission sources (EDFAs). The preferred embodiments of the present invention are also implemented in view of the need to minimize the amount of software required to enact APR. The APR mechanism of the present invention is preferably implemented in hardware and field programmable gate arrays (FPGAs). APR solutions that rely heavily on software implementations, although flexible and relatively easy to develop, tend to be difficult to prove correct. Also, during those times when the software load is being upgraded, and/or the system is rebooting, the APR mechanism is inactive and a software-implemented system would thus be operating in violation of laser safety standards.

Figure 1:
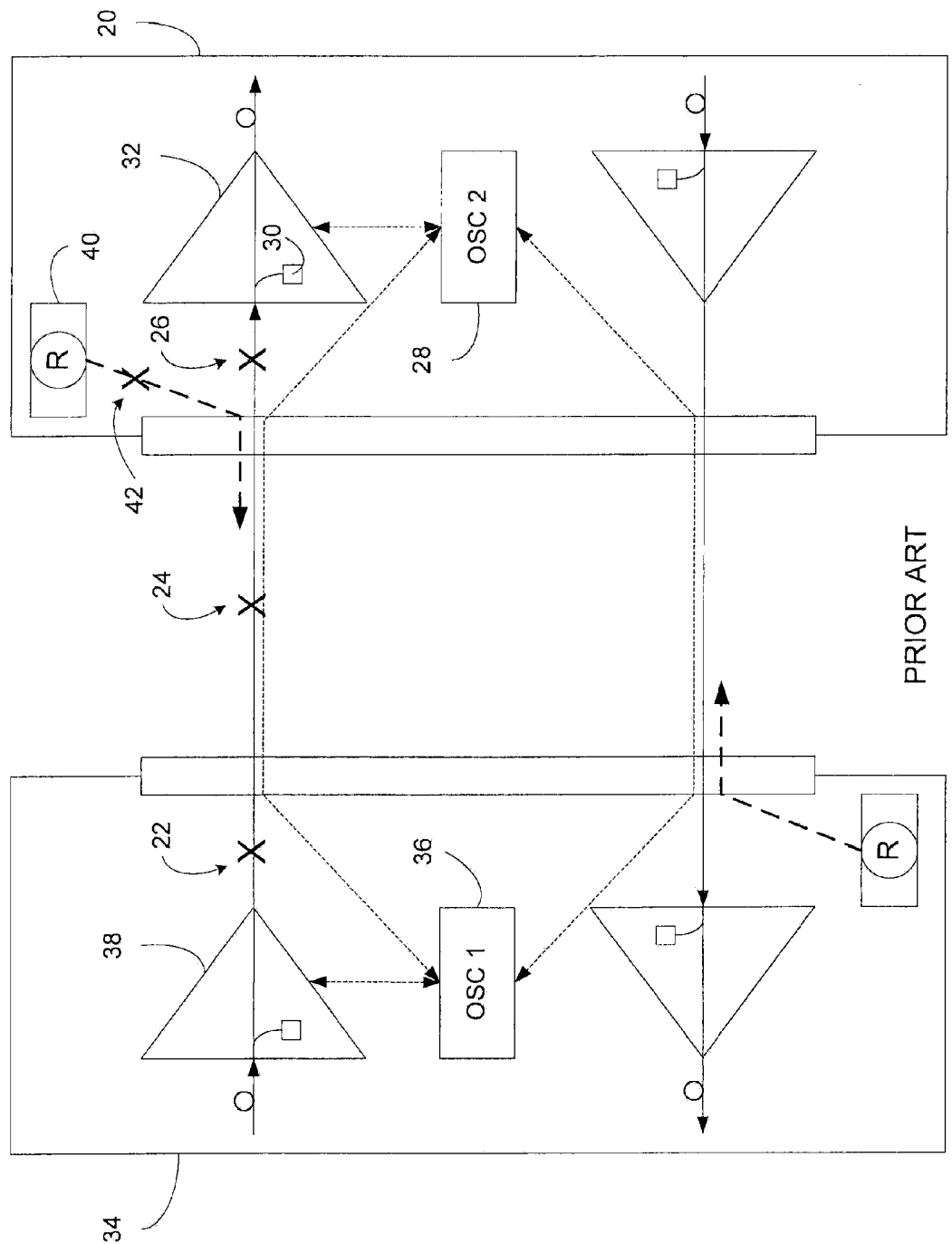
FIG. 1 is a schematic block diagram of a first embodiment of a telemetry-based solution for automatic optical power management according to the previous technology.
Figure 2:
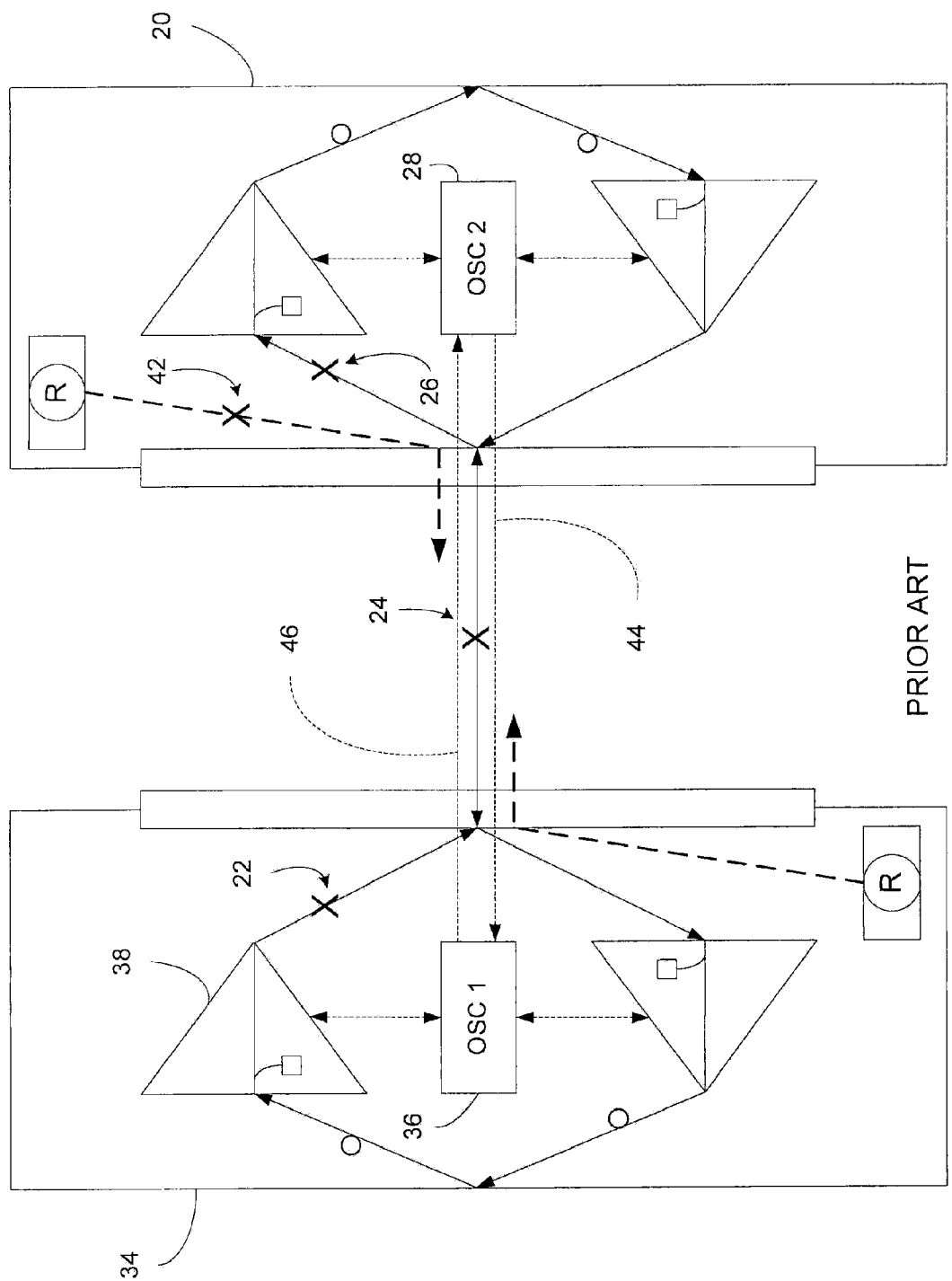
FIG. 2 is a schematic block diagram of a second embodiment of a telemetry-based solution for automatic optical power management according to the previous technology.
Figure 3:
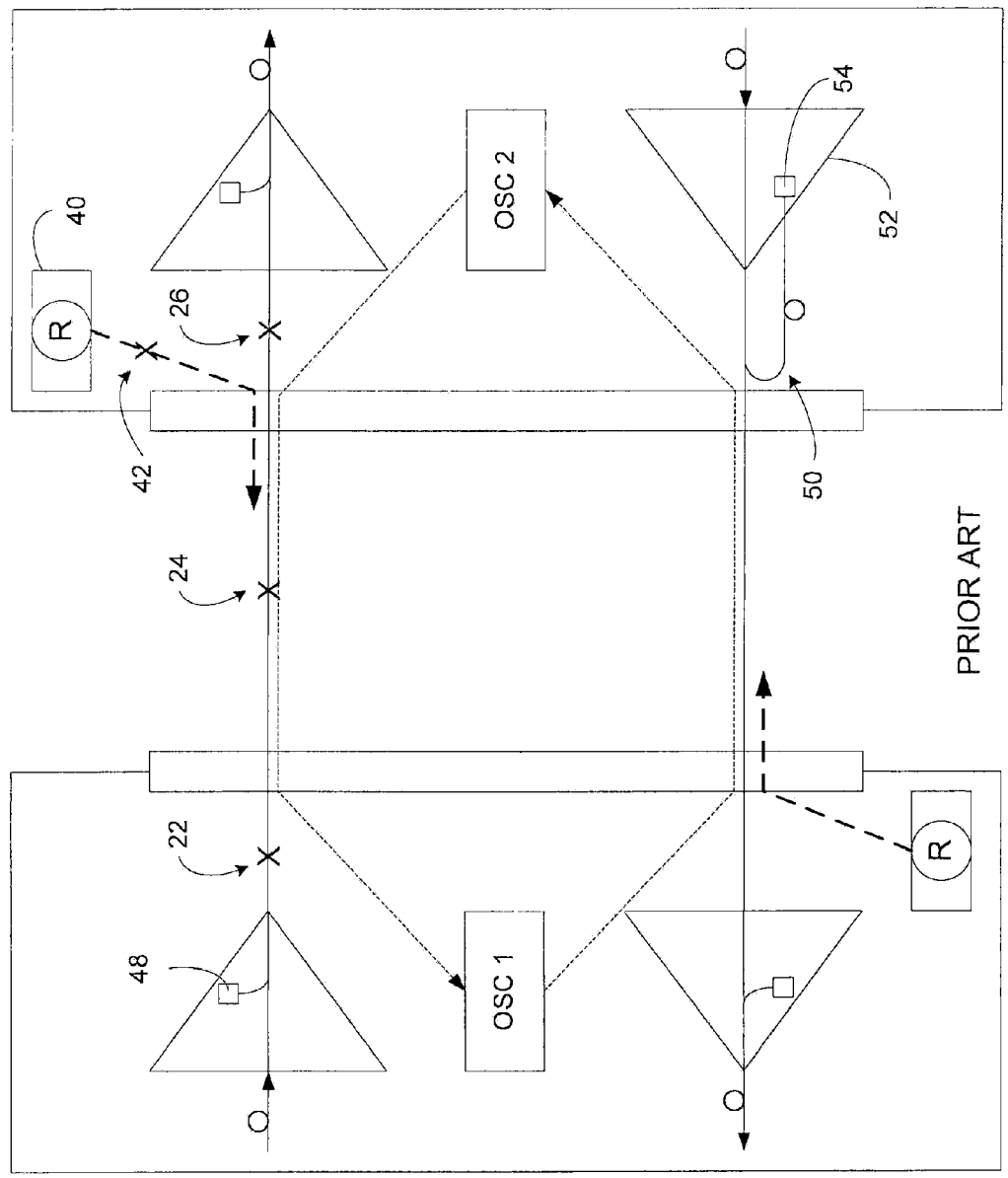
FIG. 3 is a schematic block diagram of a first embodiment of a reflection-based solution for automatic optical power management according to the previous technology.
Figure 4:
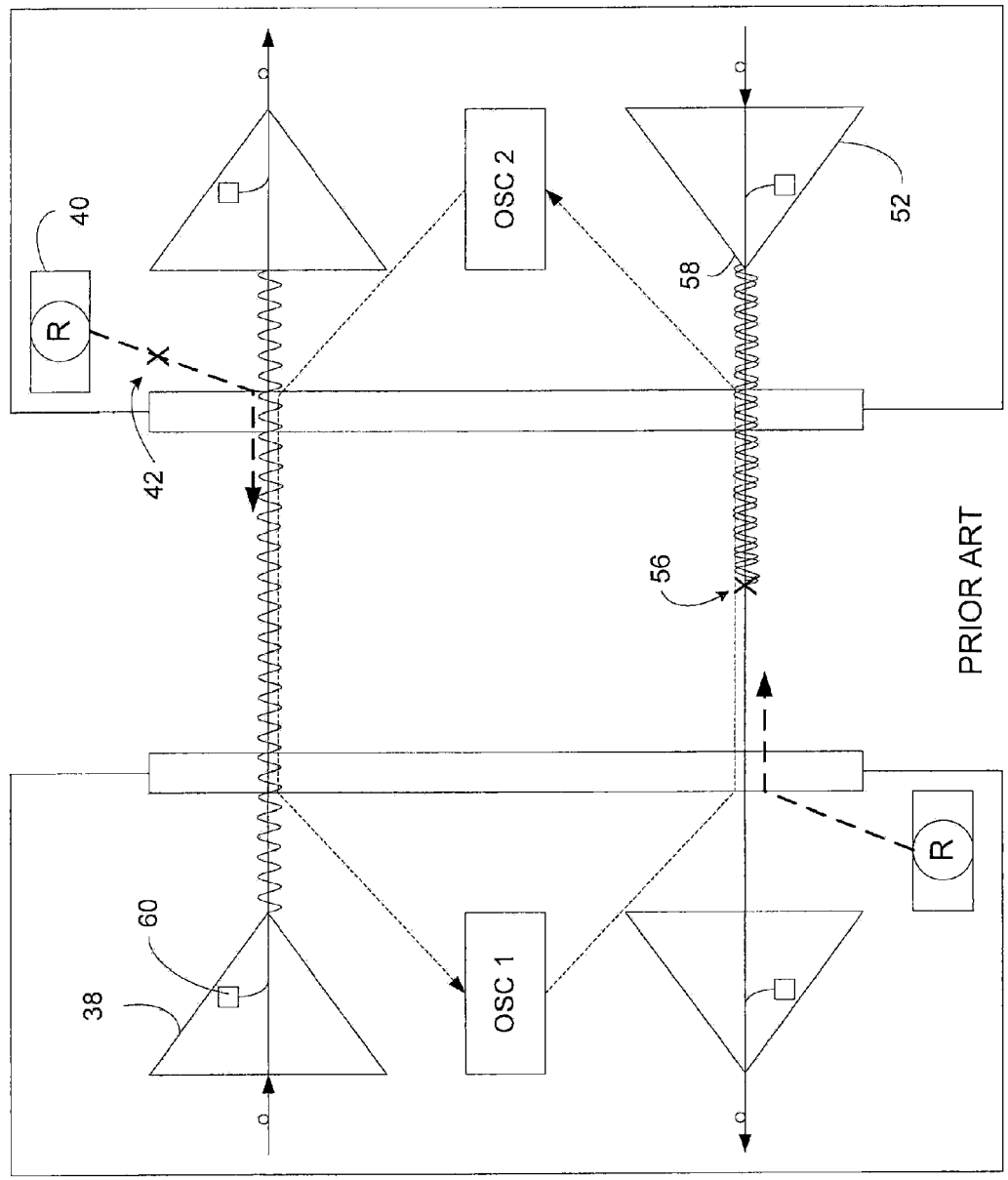
FIG. 4 is a schematic block diagram of a second embodiment of a reflection-based solution for automatic optical power management according to the previous technology.
Figure 5:
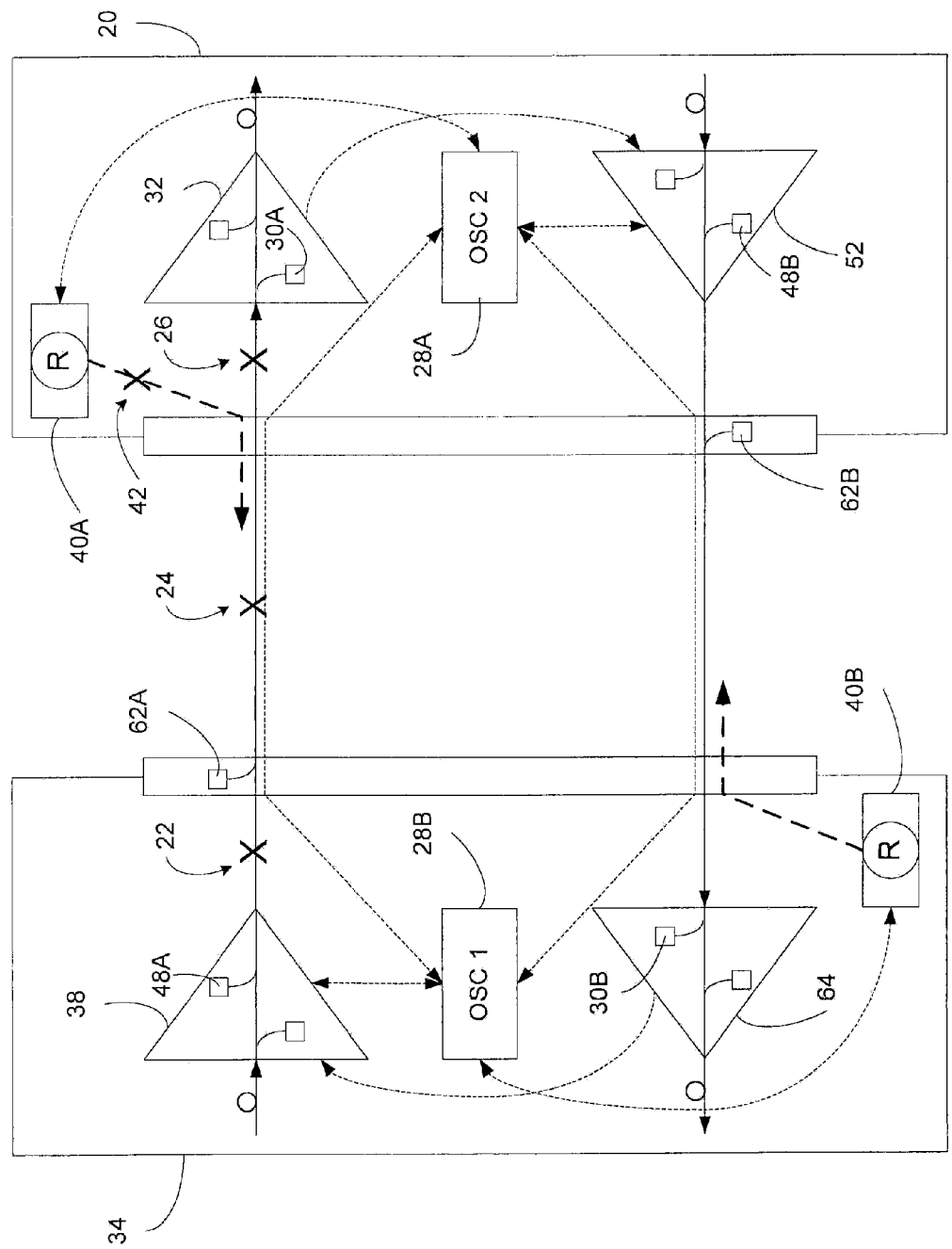
FIG. 5 is a schematic block diagram of a first preferred embodiment of a total solution for automatic optical power management according to the present invention.

Referring to FIG. 5, a first preferred embodiment of the present invention is implemented with a bidirectional optical communications system that uses two or more mono-directional (with respect to in-path optical signal traffic) fibers to accomplish the bidirectional system capabilities. OSC circuit packs 28A and 28B in each network node 20 and 34 preferably communicate bi-directionally using at least one mono-directional fiber in each direction of traffic. A reliable, redundant detection system includes in-path, downstream detectors 30A and 30B, back-reflection optical detectors 48A and 48B, optical detectors inherent to OSC circuit packs 28A and 28B, and dedicated Raman detectors 62A and 62B.

Reliable APR detection is a form of detection which will always, or almost always, detect every condition, fiber break or disconnect, which requires APR, within the time limits specified by laser safety standards, and yet never falsely trigger APR. That is, reliable APR detector will trigger APR when and only when it has been positively determined that the output optical power of this device has become un-terminated. Accordingly, a redundant systems approach is taken and combined with a logical implementation that only relies on less reliable detectors, such as those inherent to OSC circuit packs 28A and 28B, in the event that other, more reliable detectors of the redundant detection system are determined to be not operational.

Detectors that are on board the circuit pack that must undergo the power reduction are highly reliable in the sense that they seldom falsely detect LOS. Optical detector 48A is one such detector in the case of a fiber cut at 22, 24, and/or 26. Typically, these detectors monitor either optical power back reflection (light reflected back from a nearby fiber cut) or optical input power (light tapped-off the main power stream, within a few meters of the light source, and fed back to the detector via an optical tap). The advantage of these detectors is that they very rarely trigger a false APR condition and, since they are situated on the same circuit pack as the high power laser, itself, APR can be triggered extremely quickly (well under 10 ms). However, although these detectors, when activated, do indeed signal a real need for APR, they typically only catch a small subset of the fiber cuts/disconnects that may occur and require APR. For instance, a fiber that is cut at an acute angle may not reflect enough light to trigger the back reflection monitor, and a fiber that is cut at a point just beyond the optical tap would not be detected by the input power monitor.

Detectors that are located on circuit packs that are optically adjacent (downstream from the hi-power laser in question, either within the same network element or in the next network element downstream) to the packs that must undergo power reduction are also highly reliable with only a few drawbacks. These detectors monitor optical input power that they receive from the emitting light source on the circuit pack in question. Optical detector 30A is such a detector in the case of a fiber cut at 22, 24, and/or 26. These detectors are also highly reliable in the sense that they seldom falsely detect LOS. Also, since they monitor the entire optical span in question, they catch almost all of the fiber cut/disconnect scenarios with which one would be concerned. Their main drawback is that they may be over 100 km away from the circuit pack in question that must reduce power, and they therefore may pose a problem for enacting a quick (sub-second) and complete response. There is, however, another drawback in the case of co-located Raman and EDFA.

An additional drawback occurs in the case of co-located Raman pump 40 and EDFA circuit pack 32. In this case, it is not sufficient to rely on an EDFA LOS to trigger APR for both the EDFA circuit pack 38 and Raman pump 40A in the case of a fiber cut at 24 since the back-scatter effect of the Raman Amplified Spontaneous Emission (ASE) could mask the loss of input power at the detector 30A in the event of a fiber break that is some distance upstream of the Raman pump as at 24. In such a case, the present invention relies on a dedicated Raman detector 62A at the optically adjacent network element 34 that detects the loss of residual Raman power at that point, and thereby triggers Raman APR. One possible response mechanism that can be used with this detection mechanism resembles that of the telemetry-based solution, in that an LOS indicator can travel from OSC circuit pack 28B to OSC circuit pack 28A, and from there to Raman pump 40A, where Raman pump 40A is adapted to shut down in response to the received LOS indicator. Another, more reliable response mechanism is further discussed below, but the important point is that the Raman pump 40A reduces power in response to a fiber cut at 24 and/or 42. Only once the Raman has shut down will the optical detector 30A be able to detect LOS form a fiber cut at 24, and, in turn, trigger EDFA circuit pack 38 to shut down according to a response mechanism further discussed below. Thus, in the case of collocated Raman and EDFA, the redundant detection system of the present invention relies on optical detector 48A to detect a fiber cut at 22, optical detector 30A to detect a fiber cut at 26, and optical detectors 62A and 30A to detect a fiber cut at 24. The automatic power management system according to the first preferred embodiment of the present invention also uses detectors inherent to OSC circuit packs 28A and 28B.

Out-of-path detectors that are not directly in the optical traffic carrying path, but whose monitored light source shares some of the same fiber plant as the high power signal in question, are used as back-up systems in the case of known failure of detector 62A and/or 30A. Example out-of-path detectors are optical input power detectors on an Optical Supervisory Channel (OSC). Since the OSC shares much of the same fiber plant as the high power optical signal, an OSC LOS can indicate a cut in some common fiber that requires APR. The advantage of these detectors is that they are convenient (they are already there for some other purpose, such as to indicate a loss of communications) and can be inexpensive to implement. Their main disadvantage is that they are not very reliable. For example, they could only ever catch those fiber cuts/disconnects that are on common fiber as at 24. More importantly, a failure of an OSC card, or a pulled OSC card, could falsely trigger an APR condition. The latter case should be ameliorated somewhat by a hold-off time (in the order of a few seconds) to allow for an additional fault correlation algorithm to execute and confirm the condition, but this would result in a mechanism which is relatively time consuming and would quite likely require a significant amount of executable software and messaging, which may itself be prone to error. At best, out-of-path detectors may serve as a sort of failsafe mechanism that can run in the background and catch those very rare cases where both the in-path detectors have failed in some manner.

Once it has been determined that APR is required, the mechanism must enact a complete response, shut down any and all offending light sources, as quickly as possible. Ideally, this is done with little or no executing software. As was stated earlier, in the case where the detectors are on board the circuit pack carrying the light source as with optical detector 48A, this response can be quite straight forward. All that is required is that the on-board detector be linked to the control of the on-board laser via some relatively simple FPGA logic.

In the case of APR being triggered via secondary detectors, especially those that are situated on a downstream network element 20, there are a few different available mechanisms that can be used separately or combined for optimum effect. For example, in the case where one of the two fibers, interconnecting two network elements 34 and 20, has been cut as at 22, 24 and/or 26. Observe that optical detector 30A detects the LOS and needs to inform EDFA circuit pack 38 in some manner in order to affect APR. If an EDFA circuit pack 32 that detects LOS immediately informs the local EDFA circuit pack 52 facing in the opposite direction, and that EDFA circuit pack 52, in turn, cuts its output power, then the opposite path can be used to trigger APR. In this example, EDFA circuit pack 32 causes EDFA circuit pack 52 to reduce its own power, in turn causing EDFA circuit pack 64 to detect LOS, and then causing EDFA circuit pack 38 to finally reduce its own power, thus closing the APR loop. A similar solution can be used to enact Raman APR (shutting down the Raman on the opposite path), wherein optical detector 62A detects LOS from a fiber cut at 24 and/or 42, and causes Raman pump 40B to shut down, which is in turn detected by optical detector 62B which causes Raman pump 40A to shut down.

The opposite path response mechanism is more reliable than that of the previous technology, but may result in unnecessarily interrupting service on the opposite path. Also, if the opposite path suffers from a fiber cut on fiber not shared with OSC, it may be desirable to use the OSC on the opposite path to trigger shutdown. Similarly, if the opposite path suffers from a fiber cut on shared fiber, but the shared fiber on the non-opposite path is intact (fiber cut at 22, 26, or 42), then the out-of-path OSC on the non-opposite path fiber can be used. Thus, a redundant response system has at least three ways of signaling shutdown, including direct communication from a detector on the same circuit pack, communication using the opposite path, and communication via out-of path OSC channels on intact, shared portions of either fiber.

Another powerful means of ensuring a quick and complete response to a single fiber cut, while not needing to affect traffic in the opposite direction, is through the use of a dithered EDFA signal, which can be combined with a counter-propagating signal as a backup, such as an OSC or Raman wavelength. While the preferred embodiment employs a dither removal technique to trigger APR, it should be understood that addition of dither, and/or change in character affected in existing dither can alternatively be employed. The dither removal technique is further explained below with reference to FIG. 6.

Figure 6:
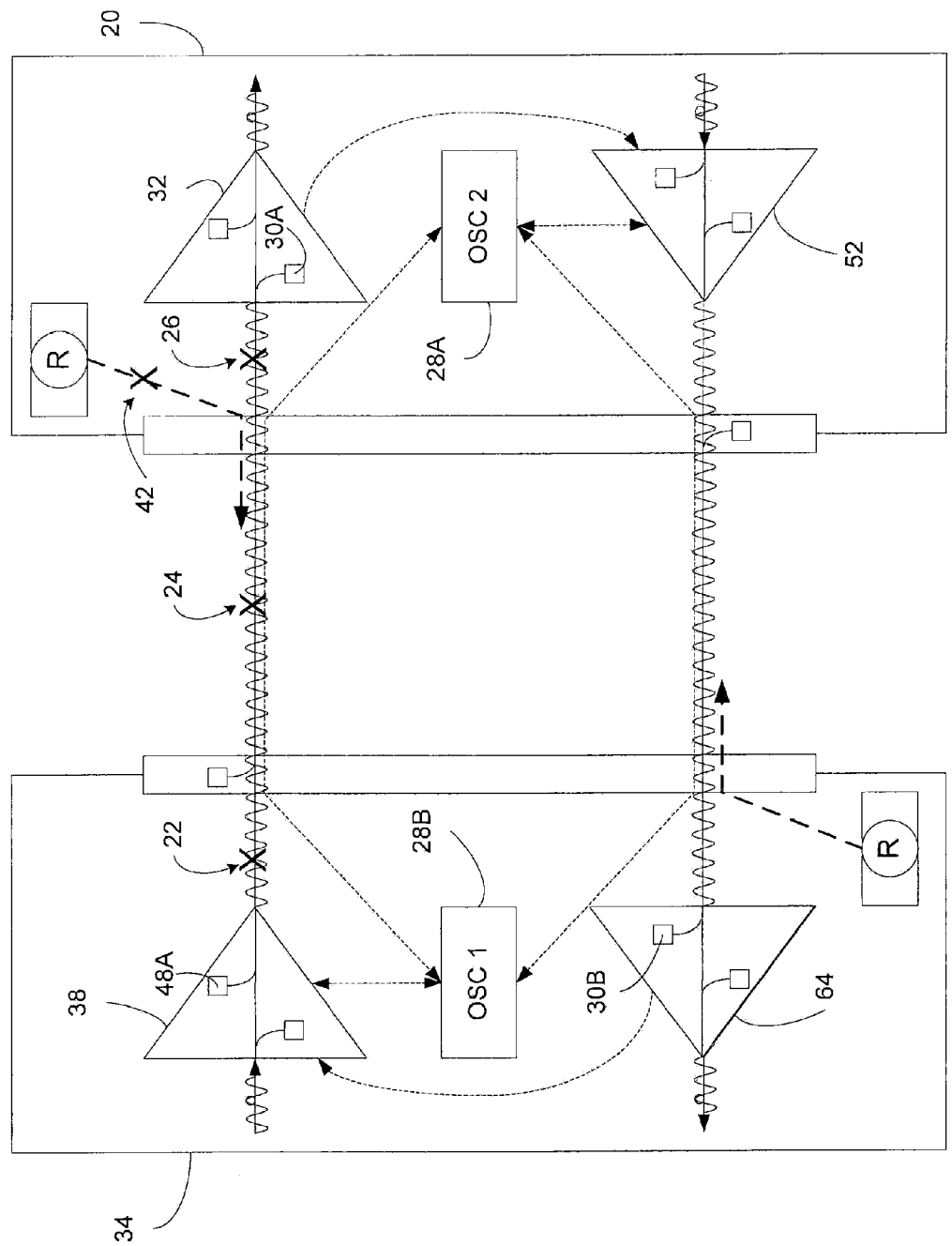
FIG. 6 is a schematic block diagram of a second preferred embodiment of a total solution for automatic optical power management according to the present invention.

FIG. 6 demonstrates the second preferred embodiment of a total solution for automatic optical power management according to the present invention. Therein, for any given EDFA circuit pack 32, 38, 52, and 64, the dithered signal is only applied if the collocated (at the same network element 20 and 34) EDFA, facing in the opposite direction, itself receives optical power. The EDFA circuit packs (such as 38) are also adapted to shut down if the collocated EDFA circuit pack (such as 64) is receiving power but no dither (from 52), but not simply because the collocated EDFA circuit pack (such as 64) is receiving no power.

In operation, shutdown of EDFA circuit pack 38 in response to a fiber cut at 22, 24, and/or 26 takes place as follows. Assuming a fiber cut at 22, 24, and/or 26, optical detector 30A detects LOS and EDFA circuit pack 32 sends a fiber LOS indicator to EDFA circuit pack 52 that indicates LOS relating to the optical fiber joining EDFA circuit packs 32 and 38 (as opposed to a dither LOS indicator signifying absence of dither in the optical signal received from EDFA circuit pack 38). In response to receipt of the fiber LOS indicator, EDFA circuit pack 52 removes dither from the light signal it transmits to EDFA circuit pack 64 without shutting down. Optical detector 30B is adapted to detect absence of dither in the optical signal it receives from EDFA 52, and EDFA circuit pack 64 is adapted send a dither LOS indicator to EDFA circuit pack 38 upon detection of dither LOS by optical detector 30B. EDFA circuit pack 38, in turn, is adapted to shut down upon receipt of the dither LOS indicator.

The out-of-path detectors inherent to OSC circuit packs 28A and 28B are used as a backup in this embodiment to handle the situation where the opposite path is not operational. Thus, if optical detector 30B is "not operational" for detecting loss of dither, it sends a "no power" signal to EDFA circuit pack 38 as an LOS indicator indicating loss of signal relating to fiber connecting circuit packs 52 and 64. This "no power" signal informs EDFA circuit pack 38 indicating that conditions have been fulfilled that render optical detector 30B "not operational", such that EDFA circuit pack 38 shuts down in response to the provisional LOS indicator. Without the "no power" signal, EDFA circuit pack 38 ignores the provisional LOS indicator, and thus avoids shutting down simply because one of the OSC cards has been pulled or become defective. Optical detectors 48A and 30A are also relied upon for detecting LOS from fiber cuts at 22 and/or 26. This solution successfully provides a reliable detection and response mechanism while avoiding shutting down the opposite path unnecessarily.

Figure 7:
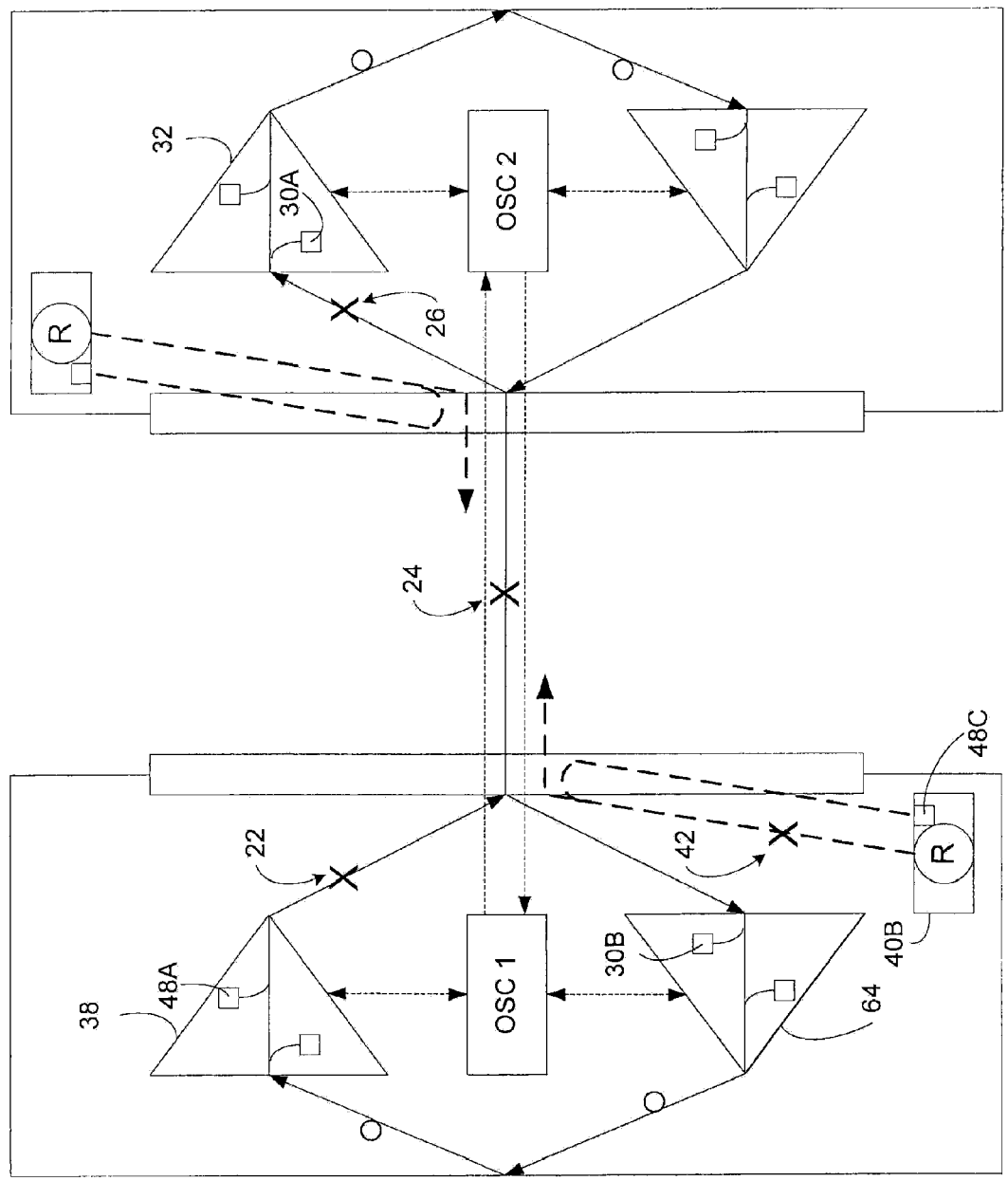
FIG. 7 is a schematic block diagram of an alternate embodiment of an automatic optical power management according to the present invention.

An alternate embodiment of an automatic optical power management according to the present invention is discussed with reference to FIG. 7. Therein, a bidirectional communications system is implemented on a single, bi-directional fiber, thus automatically rendering the opposite path unavailable. Thus, another method of ensuring a quick and complete APR response is required that is suitable for use in such an optical communications system. Accordingly, another wavelength, (1310 nm), in the opposite direction of the traffic is utilized in combination with optical detectors 48A on the circuit pack 38 that must be powered down. One skilled in the art should recognize that 1310 nm is only an example wavelength that can be used for the counter-propagating signal according to the present invention, and that any feasible wavelength outside the typical Wavelength Division Multiplexed (WDM) spectrum can alternatively be used to accomplish the present invention. This counter-propagating signal emanates from the downstream amplifier of EDFA circuit pack 32 and can be detected directly by the upstream amplifier of EDFA circuit pack 38 in order to ensure APR in all cases of fiber cuts and to limit the chances of false triggers. Even though this signal source could, itself, fail and cause an erroneous APR response, the chances of this failure happening can be proven to be a relatively low rate occurrence (mean time between failure (MTBF) data on the component in question as compared to the likelihood of fiber cuts). Thus, a fiber cut at 22, 24, or 26 is easily detected with a tradeoff of a slight increase in the chance of a false trigger. Notably, circuit pack 38 can shut down Raman pump 40B in the case of detection of fiber cut at 24 and/or 26, and Raman pump 40B can shut itself down in the case of a fiber cut at 42 using optical detector 48C with an optical tap.

Figure 8:
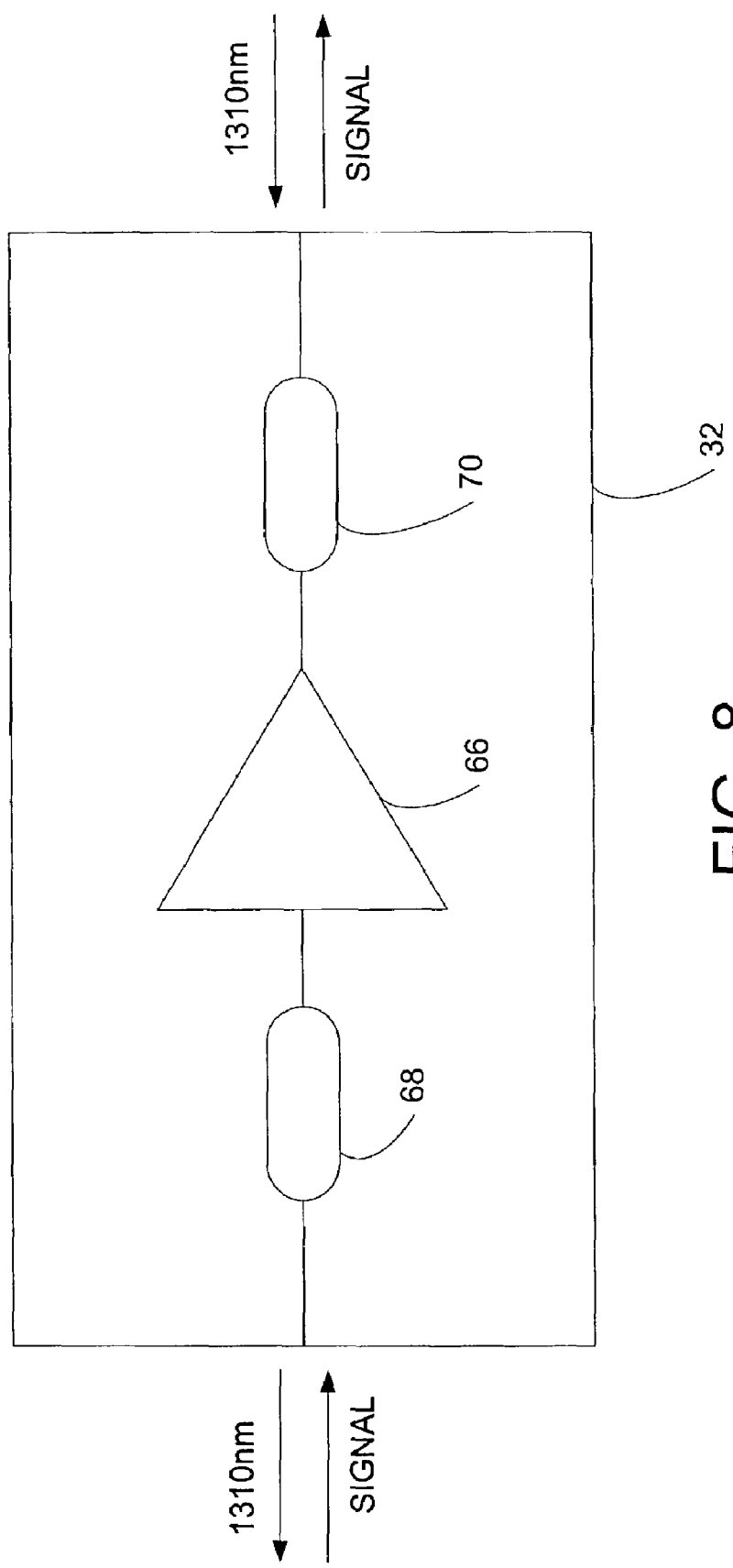
FIG. 8 is a schematic block diagram of an EDFA circuit pack having an optical transmitter generating an in-path, counter-propagating signal and a receiver detecting an in-path, counter-propagating signal according to the present invention.

FIG. 8 shows a more detailed (with internals) picture of the EDFA circuit pack 32, wherein EDFA circuit pack 32 receives an optical signal from upstream and transmits it downstream. It has an EDFA 66 that amplifies the received optical signal. It also has a transmitter 68 that produces a light signal having a wavelength of 1310 nanometers and transmits it upstream along the optical fiber on which EDFA circuit pack 32 receives the optical signal. It further has a receiver (optical detector) 70 that receives light of 1310 nanometers from downstream. The optically adjacent upstream and downstream circuit packs (not shown) have similar receivers and transmitters, and may have a laser for producing the optical signal, an amplifier for amplifying the optical signal, or a receiver for receiving the optical signal.

This approach to automatic power management has several advantages. For example, it can be extended for use with bidirectional communications systems using multiple, mono-directional fibers (with respect to in-path traffic), such that laser safety can be ensured without needing to affect the traffic in the opposite direction. Also, unidirectional traffic may alternatively be provisioned, not requiring the equipment for the opposite direction, and still be safe. Further, this approach can be combined with the previously described embodiments for further redundancy, such that the previously described techniques can be used to confirm whether the present approach is falsely triggering APR. Thus, advantages of all of these systems can be combined to further overcome disadvantages associated with each technique used alone.

The preceding disclosure has concentrated primarily on scenarios where a fully powered system must react to an unforeseen fiber cut or disconnect. Of equal importance is a scenario relating to powering-up a system to these high power levels. When doing so, It is necessary to ensure that the link is intact before safely bringing up the optical power to levels that may violate laser safety. This process is handled by having the high-power components (EDFA and Raman) first go to a safe (low) power level, which can nonetheless be detected by a downstream receiver. Once the receiver detects this power, (the LOS clears), it can signal the upstream transmitter that it is safe to go to a nominal power level suitable for communicating in-path traffic downstream, wherein the nominal power level is of sufficient magnitude to violate laser safety guidelines in the event of the fiber discontinuity.

An advantage of having the lasers operate in this low power mode by default in the case of LOS is that it becomes easier for field personnel to sectionalize and isolate the exact position of the fault when they have a low power signal continuously streaming through the fiber. Thus, to be at a point without any power at all would indicate that one is downstream from the fiber cut.

Figure 9:
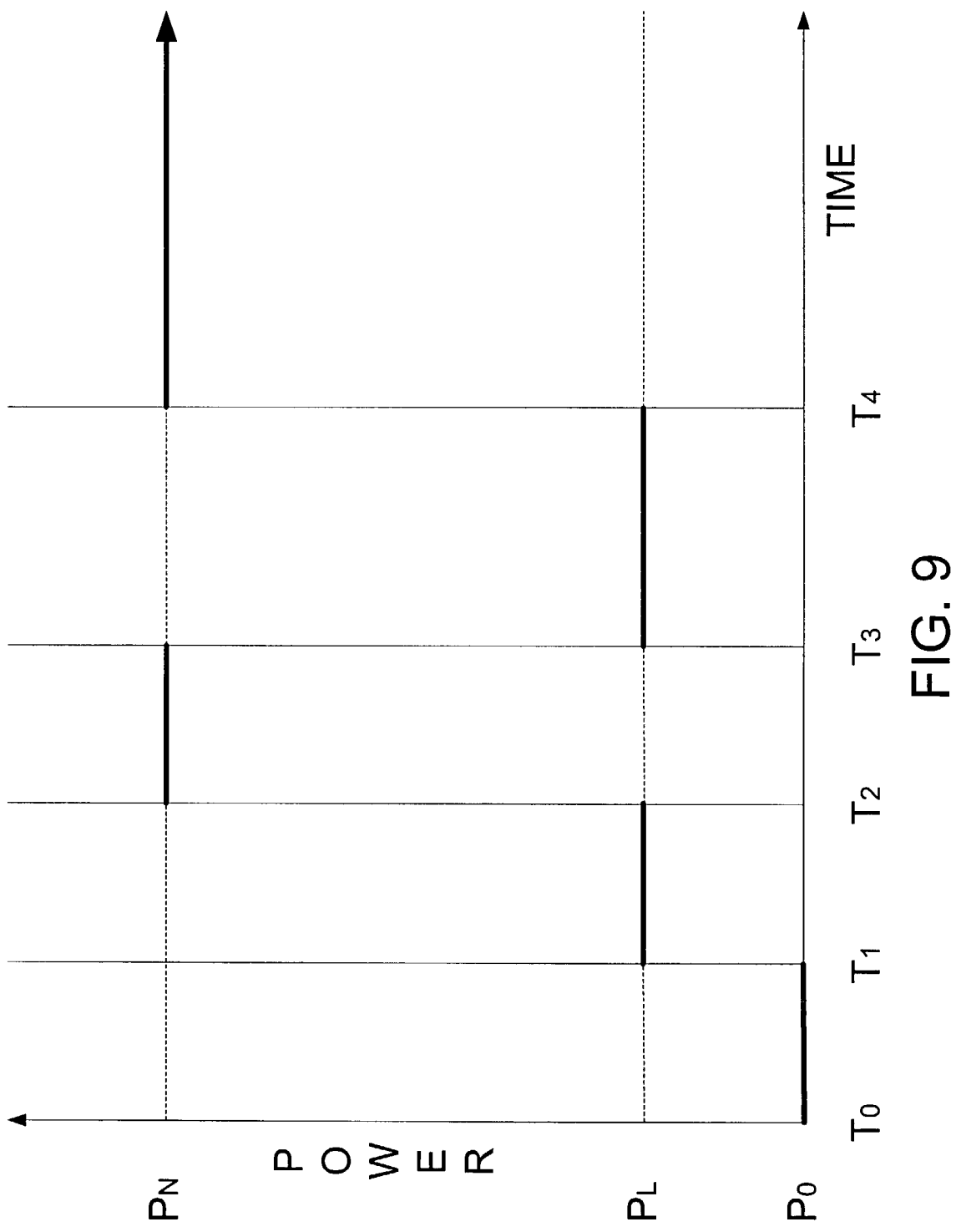
FIG. 9 is a graph depicting power fluctuation versus time with an automatic power management system according to the present invention.

FIG. 9 shows how the output of an EDFA or Raman might change, over time, in response to certain events. Therein, the EDFA or Raman power level is at a zero power level $P_0$ at a time $T_0$ before the optical communications system goes into service. At a time $T_0$, the system goes into service and the EDFA or Raman initially powers up to a low power level $P_L$ that results in emission of light that is detectable by a downstream receiver and also deemed safe in a case of a downstream fiber discontinuity. After passage of an amount of time sufficient for detection of downstream LOS and a suitable response, and in the absence of such a response, the EDFA or Raman at a time $T_2$ goes to a nominal power level $P_N$ of sufficient magnitude to violate laser safety guidelines in the event of a fiber discontinuity. At a later time $T_3$, a downstream fiber cut occurs, is detected, and a suitable response results in the EDFA or Raman pump returning to the low power level $P_L$. A technician is thus able to easily locate the fiber cut and repair it. When the repair occurs at a time $T_4$, the cut is no longer detected, an LOS indicator no longer arrives at the EDFA or Raman, and the EDFA or Raman returns to the nominal power level $P_N$ in response. Thus, automatic power, management is achieved in a quick and reliable manner. The description of the invention is merely exemplary in nature and, thus, variations that do not depart from the gist of the invention are intended to be within the scope of the invention.

What is claimed is:

1. An automatic optical power management system for use with an optical communications system, comprising:
   a first emitting light source residing in a first circuit pack and emitting light along a first optical fiber of the optical communications system, said emitting light source adapted to emit light at a nominal power level only absent receipt of an indicator signifying a loss of signal resulting from a fiber discontinuity relating to the first optical fiber, wherein the nominal power level is of sufficient magnitude to violate laser safety guidelines in the event of the fiber discontinuity;
   a redundant detection system, including a first optical detector residing in the first circuit pack and operable to detect the loss of signal, a second optical detector operable to detect the loss of signal, and residing in a second circuit pack that is optically adjacent to the first circuit pack by virtue of receiving light along the first optical fiber that is emitted by said first emitting light source, and a third optical detector residing in a third circuit pack that receives no light along the first optical fiber that is emitted by said first emitting light source, but that receives an out-of-path optical signal propagating along a portion of the first optical fiber, wherein the third optical detector is operable to detect a loss of signal resulting from fiber discontinuity relating to the portion of the first optical fiber; and
   a redundant response system operable to communicate the indicator signifying loss of signal from the first optical detector to said first emitting light source upon detection of loss of signal by the first optical detector, and from the second optical detector to said first emitting light source upon detection of loss of signal by the second optical detector, said redundant response system further being operable to communicate a provisional indicator signifying loss of signal from said third optical detector to said first emitting light source upon detection of loss of signal by the third optical detector, wherein said emitting light source is adapted to emit light at the nominal power level only absent receipt of the provisional notification if predefined conditions denoting failure of the first optical detector have been met.

2. The system of claim 1, wherein said first emitting light source is adapted to emit light at a low power setting that is detectable by a downstream receiver and also deemed safe in a case of a fiber discontinuity relating to the first optical fiber, and wherein said first emitting light source is adapted to emit power at the low power setting on initial startup and present receipt of an indicator signifying a loss of signal resulting from fiber discontinuity relating to the first optical fiber.

3. The system of claim 1, wherein said emitting light source is adapted to emit light at the nominal power level only absent receipt of the provisional notification when predefined conditions denoting failure of at least one of the first optical detector and the second optical detector have been met.

4. The system of claim 1, wherein said first optical detector is operable to detect back-reflected light resulting from a fiber discontinuity relating to the first optical fiber, and is adapted to equate detection of loss of signal with reception of the back-reflected light.

5. The system of claim 1, wherein said first optical detector is operable to detect received light from an optical tap returning emitted light back to said first circuit pack from a point on the first optical fiber, and operable to equate detection of loss of signal with absence of received light from the optical tap.

6. The system of claim 1, wherein said first optical detector is operable to detect light from a counter-propagating optical signal originating at the second circuit pack and propagating along the first optical fiber.

7. The system of claim 1 comprising a second emitting light source residing on a third circuit pack, the third circuit pack in communication with the second circuit pack, the second emitting light source emitting light along a second optical fiber, wherein said redundant detection system comprises a third optical detector residing on a fourth circuit pack that is optically adjacent to the third circuit pack by virtue of receiving light along the second optical fiber that is emitted by said second emitting light source, the fourth circuit pack in communication with the first circuit pack, wherein said redundant response system is operable to communicate the indicator signifying loss of signal from the second optical detector to the emitting light source upon detection of loss of signal by the second optical detector by causing the second emitting light source to affect an alteration in a manner in which it emits light along the second optical fiber to the fourth circuit pack, wherein the third optical detector is adapted to equate the alteration with a loss of signal in the first optical fiber, and adapted to send the indicator signifying loss of signal to said first emitting light source upon detection of loss of signal in the first optical fiber.

8. The system of claim 7, wherein said second emitting light source is operable to affect the alteration in the manner in which it emits light along the second optical fiber to the fourth circuit pack by ceasing to emit light along the second optical fiber to the fourth circuit at the nominal power level, and wherein the third optical detector is adapted to equate absence of a nominal power light signal from said second emitting light source along the second optical fiber with loss of signal on the first optical fiber.

9. The system of claim 7, wherein said second emitting light source is operable to affect the alteration in the manner in which it emits light along the second optical fiber to the fourth circuit pack by making a change related to at least one of presence and character of dither in the light it emits along the second optical fiber to the fourth circuit pack, and wherein the third optical detector is adapted to equate the change related to at least one of presence and character of dither in the light it receives along the second optical fiber from said second emitting light source with loss of signal on the first optical fiber.

10. An automatic optical power management system for use with an optical communications system, comprising:
   a first emitting light source residing in a first circuit pack and emitting light along a first optical fiber of the optical communications system, said emitting light source adapted to emit light at a nominal power level only absent receipt of an indicator signifying a loss of signal resulting from a fiber discontinuity relating to the first optical fiber, wherein the nominal power level is of sufficient magnitude to violate laser safety guidelines in the event of the fiber discontinuity;

a redundant detection system, including a first optical detector residing in the first circuit pack and operable to detect the loss of signal, and a second optical detector residing in a second circuit pack that receives no light along the first optical fiber that is emitted by said first emitting light source, but that receives an out-of-path optical signal propagating along a portion of the first optical fiber, wherein the second optical detector is operable to detect a loss of signal resulting from fiber discontinuity relating to the portion of the first optical fiber; and a redundant response system operable to communicate an indicator signifying loss of signal from the first optical detector to said first emitting light source upon detection of loss of signal by the first optical detector, and operable to communicate a provisional indicator signifying loss of signal from said second optical detector to said first emitting light source upon detection of loss of signal by the second optical detector, wherein said emitting light source is adapted to emit light at the nominal power level only absent receipt of the provisional notification if predefined conditions denoting failure of the first optical detector have been met.

11. The system of claim 10, wherein said redundant detection system includes a third optical detector residing in a third circuit pack that is optically adjacent to the first circuit pack by virtue of receiving light along the first optical fiber that is emitted by said first emitting light source, and that is not optically adjacent to the second circuit pack, wherein the third optical detector is operable to detect the loss of signal, and wherein said redundant response system is operable to communicate the indicator signifying loss of signal from the third optical detector to said first emitting light source upon detection of loss of signal by the third optical detector.

12. An automatic optical power management system for use with an optical communication system, comprising:

a first network element;

a second network element connected via an optical fiber to the first network element;

a first light emitting source residing on the first network element and operable to emit light along the optical fiber;

a first optical detector residing on the first network element and operable to detect a loss of signal resulting from a fiber discontinuity in the optical fiber;

a second optical detector residing on the second network element and operable to detect a loss of signal resulting from a fiber discontinuity in the optical fiber;

a third optical detector residing in the second network element that receives no light along the first optical fiber that is emitted by said first emitting light source, but that receives an out-of-path optical signal propagating along a portion of the first optical fiber, wherein the third optical detector is operable to detect a loss of signal resulting from fiber discontinuity relating to the portion of the first optical fiber; and a redundant response subsystem in data communication with the first optical detector, the second optical detector, and the third optical detector, said redundant response system operable to communicate an indicator signifying a loss of signal to the first light emitting source upon detection of a loss of signal by either the first optical detector or second optical detector, and operable to communicate a provisional indicator signifying loss of signal from said third optical detector to said first emitting light source upon detection of loss of signal by the third optical detector, wherein said first emitting light source is adapted to emit light at the nominal power level only absent receipt of the provisional notification if predefined conditions denoting failure of said first optical detector and said second optical detector have been met.

13. An automatic optical power management system for use with an optical communications system, comprising:

a first emitting light source residing in a first circuit pack and emitting light along a first optical fiber of the optical communications system, said emitting light source adapted to emit light at a nominal power level only absent receipt of an indicator signifying a loss of signal resulting from a fiber discontinuity relating to the first optical fiber, wherein the nominal power level is of sufficient magnitude to violate laser safety guidelines in the event of the fiber discontinuity;

a first optical detector operable to detect the loss of signal and residing in a second circuit pack that is optically adjacent to the first circuit pack by virtue of receiving light along the first optical fiber that is emitted by said first emitting light source;

a second emitting light source residing on a third circuit pack, the third circuit pack in communication with the second circuit pack, said second emitting light source emitting light along a second optical fiber, said second emitting light source operable to affect an alteration in a manner in which it emits light along the second optical fiber upon receipt of a second indicator signifying loss of signal on the first optical fiber, said first optical detector operable to communicate the second indicator to said second emitting light source upon detecting the loss of signal on the first optical fiber;

a second optical detector residing on a fourth circuit pack that is optically adjacent to the third circuit pack by virtue of receiving light along the second optical fiber that is emitted by said second emitting light source, the fourth circuit pack in communication with the first circuit pack, wherein said second optical detector is adapted to equate the alteration with loss of signal in the first optical fiber, and adapted to send the indicator signifying loss of signal to said first emitting light source upon detection by said second optical detector of loss of signal in the first optical fiber;

a third optical detector residing in a third circuit pack that receives no light along the first optical fiber that is emitted by said first emitting light source, but that receives an out-of-path optical signal propagating along a portion of the first optical fiber, wherein the third optical detector is operable to detect a loss of signal resulting from fiber discontinuity relating to the portion of the first optical fiber; and a redundant response system operable to communicate a provisional indicator signifying loss of signal from said third optical detector to said first emitting light source upon detection of loss of signal by the third optical detector, wherein said first emitting light source is adapted to emit light at the nominal power level only absent receipt of the provisional notification if predefined conditions denoting failure of said first optical detector have been met.

14. The system of claim 13, wherein said second emitting light source is operable to affect the alteration in the manner in which it emits light along the second optical fiber to the fourth circuit pack by ceasing to emit light along the second optical fiber to the fourth circuit at the nominal power level, and wherein the third optical detector is adapted to equate absence of a full-power light signal from said second emitting light source along the second optical fiber with loss of signal on the first optical fiber.

15. The system of claim 14, wherein said second emitting light source is operable to affect the alteration in the manner in which it emits light along the second optical fiber to the fourth circuit pack by making a change related to at least one of presence and character of dither in the light it emits along the second optical fiber to the fourth circuit pack, and wherein the third optical detector is adapted to equate the change related to at least one of presence and character of dither in the light it receives along the second optical fiber from said second emitting light source with loss of signal on the first optical fiber.

16. An automatic optical power management system for use with an optical communications system, comprising:
    a first optical detector operable to detect a loss of signal resulting from fiber discontinuity relating to a first optical fiber of the optical communications system;
    a first emitting light source residing in a first circuit pack and emitting light along the first optical fiber of the optical communications system, said emitting light source adapted to emit light at a low power level upon receipt of an indicator signifying the loss of signal resulting from fiber discontinuity relating to the first optical fiber, wherein the low power level results in emission of light that is detectable by a downstream receiver and also deemed safe in a case of a fiber discontinuity relating to the first optical fiber;
    a second optical detector residing in a second circuit pack that receives no light along the first optical fiber that is emitted by said first emitting light source, but that receives an out-of-path optical signal propagating along a portion of the first optical fiber, wherein the second optical detector is operable to detect a loss of signal resulting from fiber discontinuity relating to the portion of the first optical fiber; and
    a redundant response system operable to communicate an indicator signifying loss of signal from the first optical detector to said emitting light source upon detection of loss of signal by said first optical detector, and operable to communicate a provisional indicator signifying loss of signal from said second optical detector to said first emitting light source upon detection of loss of signal by the second optical detector,
    wherein said emitting light source is adapted to emit light at the nominal power level only absent receipt of the provisional notification if predefined conditions denoting failure of the first optical detector have been met.

17. The system of claim 16, wherein said first emitting light source is adapted to emit light at the low power level upon initial startup.

18. The system of claim 16, wherein said first emitting light source is adapted to emit light at a nominal power level absent receipt of the indicator, wherein the nominal power level is of sufficient magnitude to violate laser safety guidelines in the event of the fiber discontinuity.

* * * * *